United States Patent
Toyoguchi

(10) Patent No.: US 9,544,493 B2
(45) Date of Patent: Jan. 10, 2017

(54) SOLID-STATE IMAGING APPARATUS AND IMAGING SYSTEM USING THE SAME

(71) Applicant: CANON KABUSHIKI KAISHA, Tokyo (JP)

(72) Inventor: Ginjiro Toyoguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/593,033

(22) Filed: Jan. 9, 2015

(65) Prior Publication Data

US 2015/0215554 A1 Jul. 30, 2015

(30) Foreign Application Priority Data

Jan. 29, 2014 (JP) ................................ 2014-014120

(51) Int. Cl.
| | |
|---|---|
| *H04N 5/378* | (2011.01) |
| *H04N 5/232* | (2006.01) |
| *H04N 5/369* | (2011.01) |
| *H04N 5/374* | (2011.01) |

(52) U.S. Cl.
CPC ........ *H04N 5/23212* (2013.01); *H04N 5/3696* (2013.01); *H04N 5/374* (2013.01); *H04N 5/378* (2013.01)

(58) Field of Classification Search
CPC .. H04N 5/378; H04N 5/23212; H04N 5/2356; H04N 5/3696
See application file for complete search history.

(56) References Cited

U.S. PATENT DOCUMENTS

| | | | | |
|---|---|---|---|---|
| 2002/0036257 A1* | 3/2002 | Yamashita | ......... | H04N 5/23212 250/208.1 |
| 2008/0074534 A1* | 3/2008 | Kusaka | .............. | H04N 5/23212 348/364 |
| 2008/0259202 A1* | 10/2008 | Fujii | .................. | H04N 5/23212 348/345 |
| 2010/0091161 A1* | 4/2010 | Suzuki | .............. | H01L 27/14609 348/302 |
| 2013/0113966 A1 | 5/2013 | Arishima et al. | | |

(Continued)

FOREIGN PATENT DOCUMENTS

| | | |
|---|---|---|
| JP | 2011-060815 A | 3/2011 |
| JP | 2013-102383 A | 5/2013 |
| JP | 2013-157883 A | 8/2013 |

*Primary Examiner* — Abdelaaziz Tissire
(74) *Attorney, Agent, or Firm* — Fitzpatrick, Cella, Harper & Scinto

(57) ABSTRACT

Provided is a solid-state imaging apparatus including: imaging pixels each configured to generate an imaging signal through photoelectric conversion; focus detection pixels each configured to generate a focusing signal through photoelectric conversion; and an adding unit configured to add the imaging signals generated by the imaging pixels to generate an added imaging signal, and configured to add the focusing signals generated by the focus detection pixels to generate an added focusing signal, in which a number of the focusing signals to be used by the adding unit to generate one added focusing signal is larger than a number of the imaging signals to be used by the adding unit to generate one added imaging signal, and operation for outputting the added focusing signal and operation for outputting each of the focusing signals without adding are selectively carried out.

19 Claims, 8 Drawing Sheets

(56) References Cited

U.S. PATENT DOCUMENTS

| | | | |
|---|---|---|---|
| 2013/0194471 A1* | 8/2013 | Yamashita | H04N 5/374 348/308 |
| 2015/0009383 A1* | 1/2015 | Fujii | H04N 5/347 348/302 |
| 2015/0124139 A1* | 5/2015 | Ishiwata | H01L 27/14643 348/308 |

* cited by examiner

SOLID-STATE IMAGING APPARATUS AND IMAGING SYSTEM USING THE SAME

BACKGROUND OF THE INVENTION

Field of the Invention

The present invention relates to a solid-state imaging apparatus having a focus detecting device mounted thereon, and an imaging system using the same.

Description of the Related Art

In Japanese Patent Application Laid-Open No. 2011-60815, there is disclosed a focus detecting device of a phase difference detection system in which focus detection pixels (pixels for autofocus (AF)) are disposed on an imaging surface. The phase difference detection system is a focus detection system in which a focus adjusting state of an optical system is detected by detecting an image interval (phase difference) between focus detection pixels. The focus detection pixels of the focus detecting device each include a light shielding layer for shielding a part of an opening in a photoelectric conversion unit for the purpose of selectively introducing a light flux that passes through the optical system into photoelectric conversion units of the focus detection pixels.

In Japanese Patent Application Laid-Open No. 2013-102383, there is disclosed a solid-state imaging apparatus that improves a signal-to-noise (S/N) ratio of signals of AF pixels by setting an amplification factor of a signal from an imaging pixel and an amplification factor of a signal from an AF pixel of a phase difference detection system to be different from each other.

The focus detection pixels of a solid-state imaging apparatus disclosed in Japanese Patent Application Laid-Open No. 2011-60815 each include the light shielding layer for shielding a part of the opening. This narrows an opening in the focus detection pixel compared with an opening in the imaging pixel, and thus, an output signal of the focus detection pixel tends to be smaller than that of the imaging pixel. Therefore, there are cases in which adequate sensitivity for detecting a focus cannot be obtained.

One way to improve sensitivity of detecting a focus in such a structure is, as disclosed in Japanese Patent Application Laid-Open No. 2013-102383, to increase the amplification factor of the AF pixel. However, when the amplification factor is increased, noise that is output together with a signal from the pixel may also be amplified, and thus, depending on the source of the noise, the S/N ratio may not be improved. In particular, when the brightness is low, the S/N ratio of a signal that is output from the pixel is low, and thus, a problem in that the focus detection performance is lowered may arise. On the other hand, with regard to the imaging pixel, not only higher sensitivity but also higher resolution imaging is required.

SUMMARY OF THE INVENTION

According to one embodiment of the present invention, there is provided a solid-state imaging apparatus, including: a plurality of imaging pixels each configured to generate an imaging signal through photoelectric conversion; a plurality of focus detection pixels each configured to generate a focusing signal through photoelectric conversion; and an adding unit configured to add a plurality of the imaging signals generated by the plurality of imaging pixels to generate an added imaging signal, and configured to add a plurality of the focusing signals generated by the plurality of focus detection pixels to generate an added focusing signal, in which a number of the focusing signals to be used by the adding unit to generate one added focusing signal is larger than a number of the imaging signals to be used by the adding unit to generate one added imaging signal, and operation for outputting the added focusing signal and operation for outputting each of the plurality of focusing signals without adding are selectively carried out.

Further features of the present invention will become apparent from the following description of exemplary embodiments with reference to the attached drawings.

DESCRIPTION OF THE EMBODIMENTS

Preferred Embodiments of the Present Invention will now be described in detail in accordance with the accompanying drawings. Throughout the drawings, like reference symbols are used to designate like components, and redundant description of similar components is sometimes omitted.

First Embodiment

Figure 1:
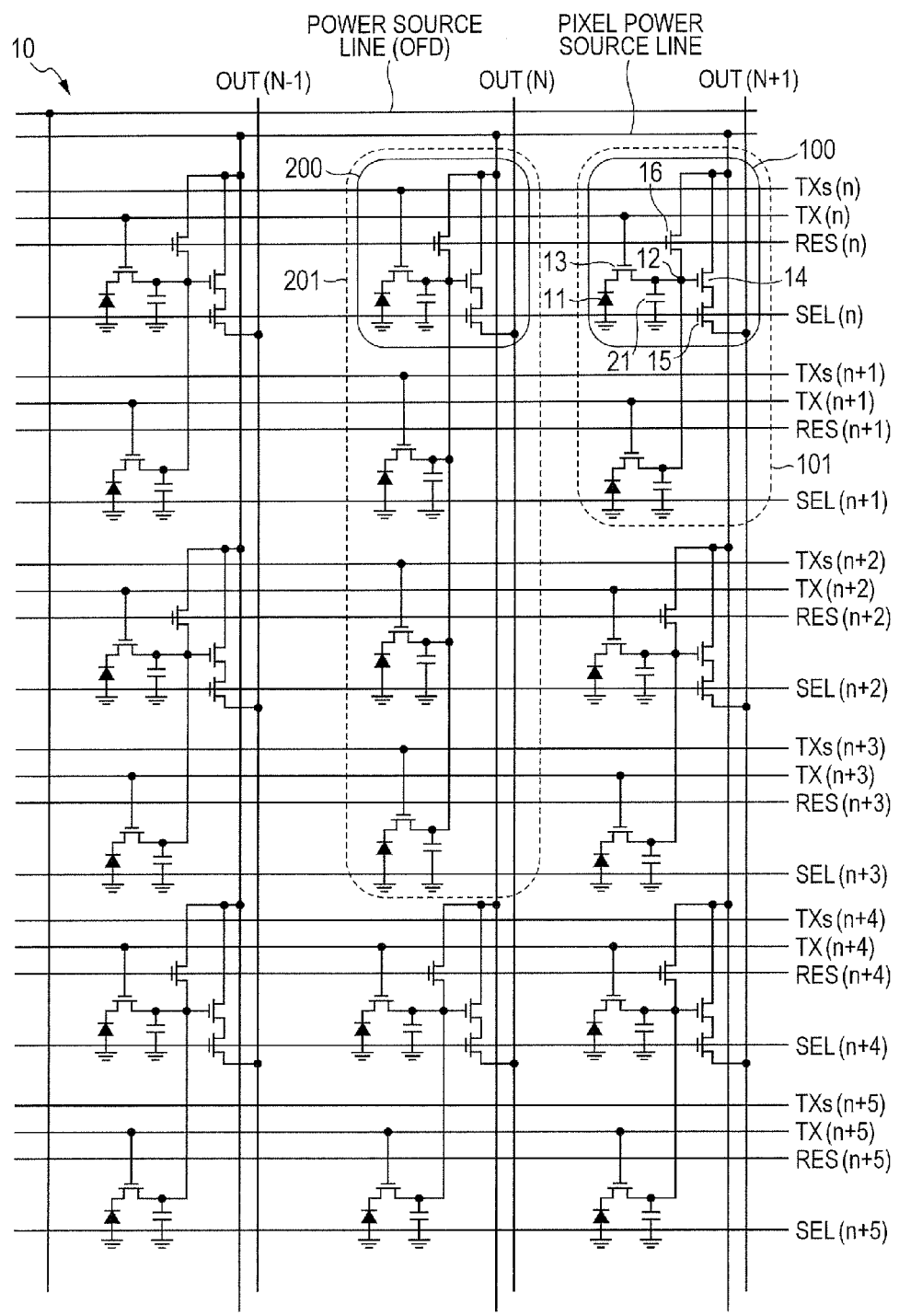
FIG. 1 illustrates a part of a pixel circuit structure according to a first embodiment of the present invention.

A first embodiment of the present invention relates to a pixel structure of a solid-state imaging apparatus such as a CMOS image sensor and a method of driving the same. FIG. 1 illustrates a pixel circuit structure of an imaging region according to the first embodiment of the present invention, illustrating a part of a pixel array 10 in which a plurality of pixels are arranged in matrix. In the pixel array 10, the pixels are arranged in pixel rows and pixel columns of 1,920 columns×1,080 rows, for example. FIG. 1 exemplifies pixel circuits of six rows (from the n-th pixel row to the (n+5)th pixel row)×three columns (from the (N−1)th pixel column to the (N+1)th pixel column) in the pixel array 10.

The pixel array 10 includes imaging pixels 100 that output an imaging signal and focus detection pixels 200 that output a focus detection signal of a phase difference detection system. Each of the pixels includes a photoelectric conversion unit 11, a floating diffusion region 12, a transfer transistor 13, an amplifier transistor 14, a select transistor 15, and a reset transistor 16. Each of the transistors may be formed of an N-channel MOSFET or the like.

The photoelectric conversion units 11 and the transfer transistors 13 of a plurality of pixels are connected to the floating diffusion region 12 of the imaging pixel 100. In other words, a set of the floating diffusion region 12, the amplifier transistor 14, the select transistor 15, and the reset transistor 16 is shared by a plurality of the photoelectric conversion units 11 and the transfer transistors 13.

Similarly, in the focus detection pixel 200, a set of the floating diffusion region 12, the amplifier transistor 14, the select transistor 15, and the reset transistor 16 is shared by a plurality of the photoelectric conversion units 11 and the transfer transistors 13.

In the example illustrated in FIG. 1, two of the imaging pixels 100 that are side by side in a column direction share one floating diffusion region 12 to form a two-pixel sharing imaging pixel 101. Further, four of the focus detection pixels 200 that are side by side in the column direction share one floating diffusion region 12 to form a four-pixel sharing focus detection pixel 201.

In FIG. 1, for example, in the n-th pixel row, the imaging pixel 100 and the focus detection pixel 200 are mixedly arranged, but one row may include only the focus detection pixels 200 or only the imaging pixels 100. For example, in the (n+4)th pixel row, the imaging pixels 100 are arranged, but no focus detection pixel 200 is arranged. Further, with regard to each of the pixel rows, a pixel other than the imaging pixel 100 and the focus detection pixel 200, such as an optical black (OB) pixel, may be arranged.

Next, detailed structures and methods of driving the imaging pixel 100 and the focus detection pixel 200 are described. The photoelectric conversion unit 11 is a photoelectric conversion element, such as a photodiode, that generates electric charge by photoelectric conversion when light is incident thereon. The transfer transistor 13 is connected between the photoelectric conversion unit 11 and the floating diffusion region 12, and transfers the electric charge generated by the photoelectric conversion unit 11 to the floating diffusion region 12. The floating diffusion region 12 is connected to the transfer transistor 13, the amplifier transistor 14, and the reset transistor 16. The floating diffusion region 12 includes an equivalent capacitor 21 that exists as a parasitic capacitor between the floating diffusion region 12 and a ground, and generates a voltage in accordance with the electric charge transferred from the photoelectric conversion unit 11. The voltage at the floating diffusion region 12 is input to a gate electrode of the amplifier transistor 14. The amplifier transistor 14 outputs an output corresponding to the voltage at the floating diffusion region 12 in the preceding stage to a vertical output line OUT via the select transistor 15. Note that, the vertical output line in the N-th column is represented as OUT(N). In this way, the electric charge generated by the photoelectric conversion unit 11 is converted into a voltage signal to be output to the vertical output line OUT. The reset transistor 16 is connected between the floating diffusion region 12 and a pixel power source line, and has the function of resetting the voltage at the floating diffusion region 12 to a predetermined voltage when the reset transistor 16 is turned on. The select transistor 15 has the function of selecting a row to which an imaging signal is to be output.

A transfer control line TX that is a first transfer control line is connected to a gate electrode of the transfer transistor 13 of the imaging pixel 100. A transfer control line TXs that is a second transfer control line is connected to a gate electrode of the transfer transistor 13 of the focus detection pixel 200. Each of the transfer control lines TX and TXs is shared in each of the rows, and a transfer control line in the n-th row is represented as TX(n) or TXs(n). When a control signal that is transmitted via the transfer control line TX or TXs is input to the transfer transistor 13, the transfer transistor 13 is controlled to be on (connected) or off (disconnected).

The number of the transfer control lines assigned to a pixel row that includes both the imaging pixel 100 and the focus detection pixel 200 and the number of the transfer control lines assigned to a pixel row that includes the imaging pixel 100 but does not include the focus detection pixel 200 are the same. For example, two transfer control lines TX(n) and TXs(n) are assigned to the n-th pixel row, and two transfer control lines TX(n+4) and TXs(n+4) are assigned to the (n+4)th pixel row.

A reset control line RES is connected to a gate electrode of the reset transistor 16 and a reset control signal is supplied thereto. When the reset control signal is supplied, the reset transistor 16 is controlled to be on or off. A select control line SEL is connected to a gate electrode of the select transistor 15 and a select control signal is supplied thereto. When the select control signal is supplied, the select transistor 15 is controlled to be on or off. Similarly to the case of the transfer control lines TX and TXs, a reset control line RES and a select control line SEL in the n-th row are represented as RES(n) and SEL(n), respectively.

Figure 2:
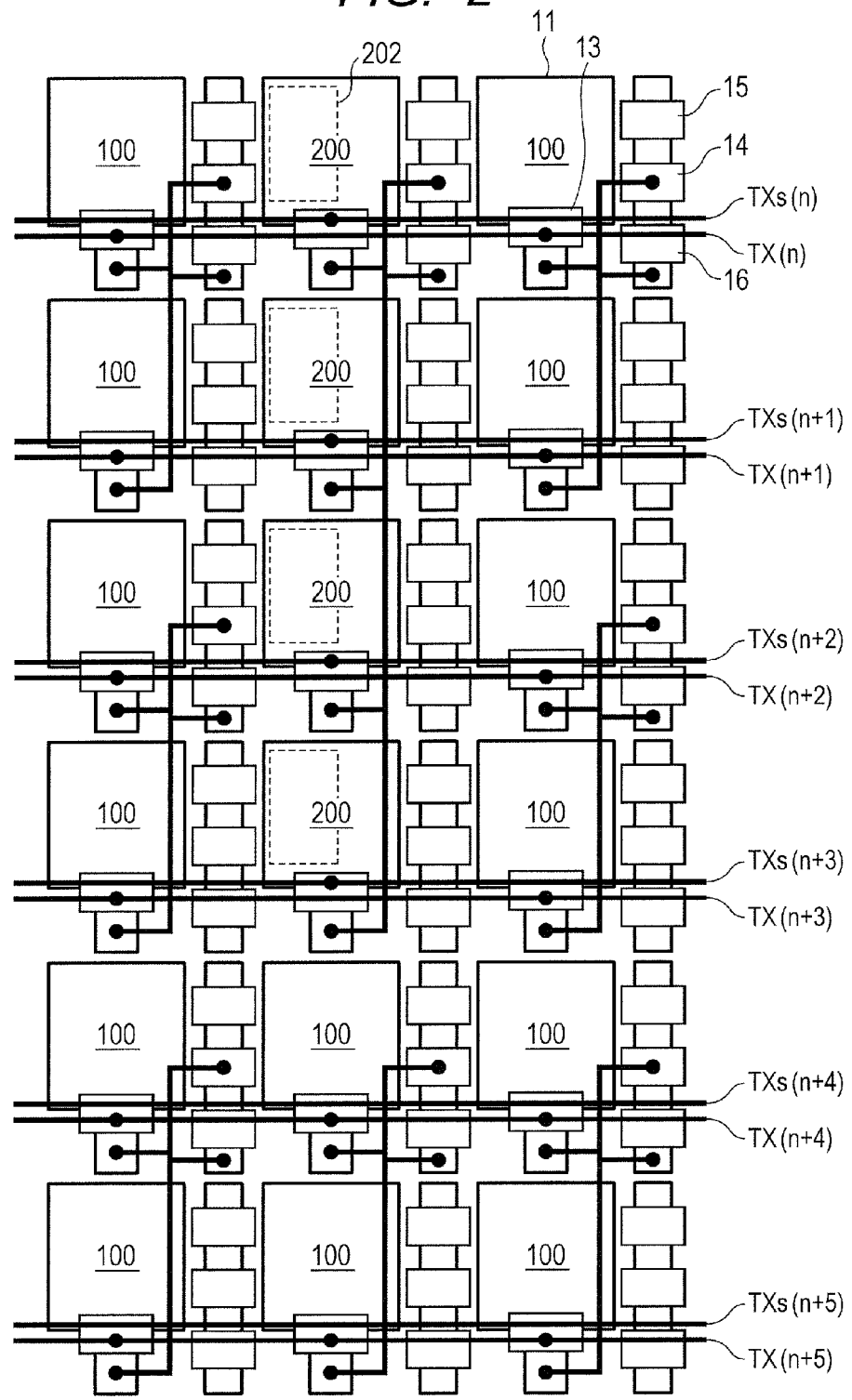
FIG. 2 is a plan view illustrating a layout of a pixel structure according to the first embodiment of the present invention.

FIG. 2 is a plan view illustrating a layout of a pixel structure according to the first embodiment of the present invention. Description of components similar to those in the circuit illustrated in FIG. 1 is omitted. Further, the reset control line RES and the select control line SEL are not illustrated.

A part of an upper surface (in FIG. 2, the left side) of the photoelectric conversion unit 11 of the focus detection pixel 200 is covered with a light shielding film 202. The light shielding film 202 is a thin film formed of a material that hardly transmits or does not transmit light, such as aluminum. The light shielding film 202 is arranged between a light receiving surface of the photoelectric conversion unit 11 and a microlens (not shown) formed above the light receiving surface. However, the light shielding film 202 may be arranged above the microlens. The photoelectric conversion unit 11 of the imaging pixel 100 is not covered with a light shielding portion, or is covered with a light shielding portion in an area smaller than that of the portion of the photoelectric conversion unit 11 of the focus detection pixel 200 that is covered with the light shielding film 202.

In a plurality of focus detection pixels 200 that share the floating diffusion region 12, all the light shielding films 202 formed in the respective pixels shield the same side of the photoelectric conversion units from light. That is, in FIG. 2, the left side is shielded from light in each of the pixels 200. This allows only a light flux that passes the right side of the focus detection pixel 200 to form an image in the photoelectric conversion unit 11, whereby a first focusing signal is output from the focus detection pixel 200. The pixel array 10 further includes a focus detection pixel (not shown) for which, contrary to the case illustrated in FIG. 2, only the right side is shielded from light. In this pixel, only a light flux that passes the left side forms an image in the photoelectric conversion unit 11, whereby a second focusing signal is output. In this way, two kinds of focus detection signals that pass through different optical systems can be obtained. A focus is detected by comparing the phases in the signals.

As described above, focus detection is realized by shielding a half of the photoelectric conversion unit 11 of the focus detection pixel 200 from light by the light shielding film 202. However, a half of the photoelectric conversion unit 11 is covered to reduce the amount of light that is incident thereon, and thus, sensitivity per pixel of the focus detection pixel 200 is lower than that of the imaging pixel 100.

In this embodiment, a structure of the focus detection pixel 200 is adopted in which the floating diffusion region 12 is shared by pixels in which the same side is shielded from light. Therefore, electric charge that is output from the photoelectric conversion units 11 of the plurality of focus detection pixels 200 can be added in the floating diffusion region 12. In other words, a plurality of focusing signals are added. A signal generated by adding a plurality of focusing signals is herein referred to as a added focusing signal. Further, also in the imaging pixel 100, a similar structure is used so that electric charge that is output from the photoelectric conversion units 11 of the plurality of imaging pixels 100 can be added in the floating diffusion region 12. In other words, a plurality of imaging signals are added. A signal generated by adding a plurality of imaging signals is herein referred to as a added imaging signal.

In the focus detection pixel 200, output signals from four pixels in which the same side is shielded from light are added to generate one added focusing signal. On the other hand, in the imaging pixel 100, output signals from two pixels are added to generate one added imaging signal. That is, the number of output signals to be added for the focus detection pixel 200 is four, and the number of output signals to be added for the imaging pixel 100 is two. Therefore, the number of signals to be added is set so that more signals are added to be output for the focus detection pixel 200 that has lower sensitivity per pixel. This reduces or solves the problem of lower sensitivity for the reason described above, and higher sensitivity of the focus detection pixel 200 is realized. Note that, when signals from n pixels are added to form one signal, this state is herein referred to as "added number is n". Further, a state in which the floating diffusion regions 12 of n pixels are electrically connected to be shared by a plurality of pixels is referred to as "shared number is n". A state in which no adding or sharing is made is sometimes referred to as "added number is one" or "shared number is one".

On the other hand, the imaging pixel 100 is required to have a high resolution in order to obtain a sharp image. With regard to the imaging pixel 100, only two pixels are added, and the added number for the imaging pixel 100 is smaller than that for the focus detection pixel 200. Thus, loss of sharpness of an image due to the added signal of a plurality of pixels is suppressed. For the reason described above, the solid-state imaging apparatus according to this embodiment attains both a higher resolution of an imaging pixel and higher sensitivity of a focus detection pixel, and improves resolution of an image as well as focus detection performance when the brightness is low.

Figure 3:
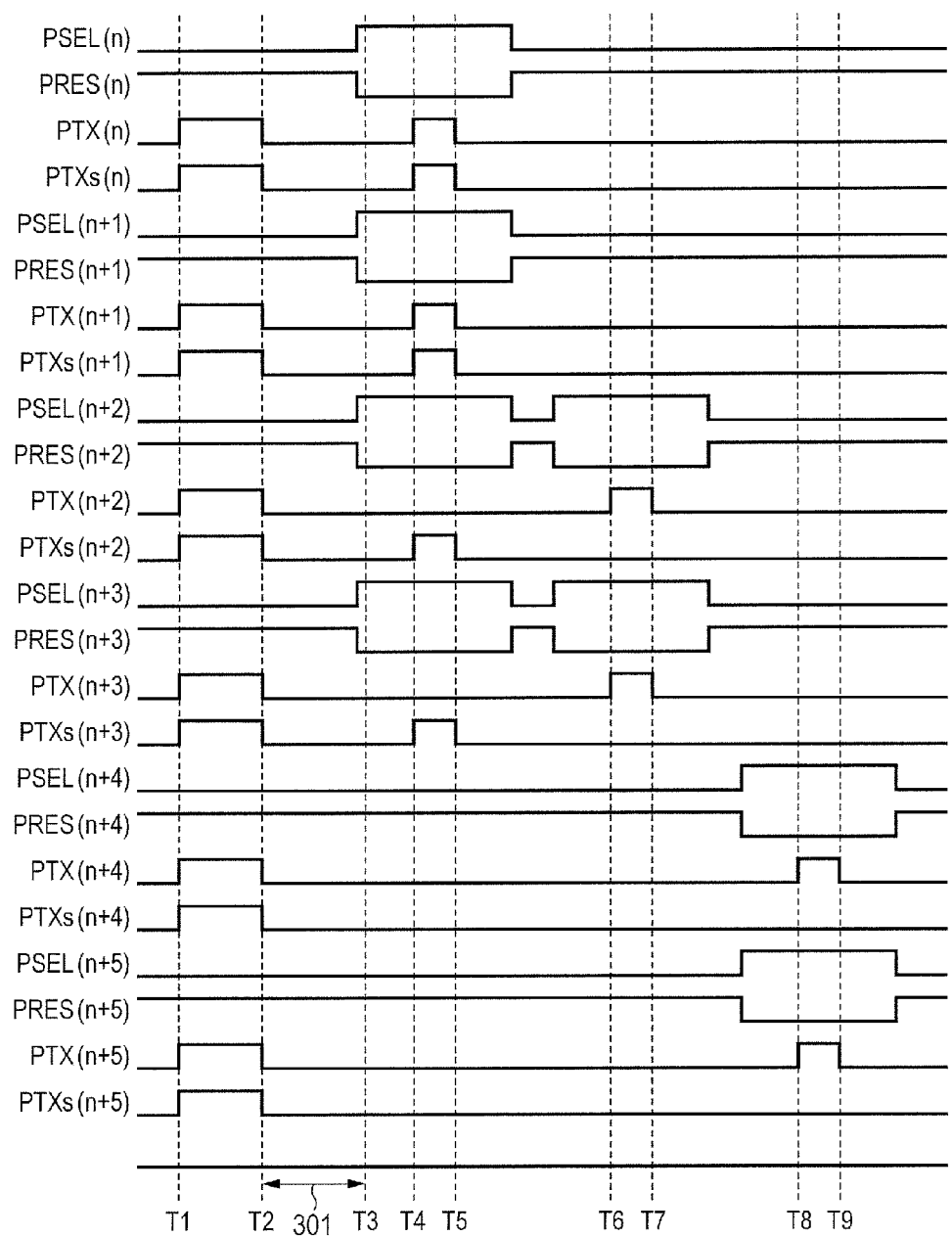
FIG. 3 is a timing chart illustrating timing for driving the pixel circuit illustrated in FIG. 1.

FIG. 3 is a timing chart illustrating timing for driving the pixel circuit illustrated in FIG. 1. An exemplary set of control pulses of the pixel circuit illustrated in FIG. 1 is described. With regard to all the control pulses, a high level means that the transistor is on. Further, timing for supplying a control pulse is controlled by a timing control unit (not shown). In this embodiment, signals are added by a control pulse supplied to the pixels. Thus, a control pulse supply unit is an example of an adding unit, or an adding unit.

At time T1, TX and TXs of all the pixels transition from a low level to the high level. At time T2, TX and TXs of all the pixels transition from the high level to the low level. Further, during a period from time T1 to time T2, PSEL of all the pixels is at the low level, and PRES of all the pixels is at the high level. In other words, during the period from time T1 to time T2, the transfer transistor 13 is on, the select transistor 15 is off, and the reset transistor 16 is on. This operation discharges electrons accumulated in the photoelectric conversion unit 11 via the floating diffusion region 12 to a drain of the reset transistor 16 to reset the pixel circuit. Next, a period from time T2 to time T3 is an exposure period 301 during which the photoelectric conversion unit 11 is exposed to light to generate electrons.

At time T4, TX(n) and TX(n+1) of the imaging pixels 100 in the n-th row and the (n+1)th row transition from the low level to the high level. At time T5, TX(n) and TX(n+1) transition from the high level to the low level. This operation turns on the transfer transistors 13 in the n-th row and the (n+1)th row, and electrons generated during the exposure period 301 are transferred from the imaging pixels 100 to the floating diffusion region 12. This causes the electrons to be transferred from the photoelectric conversion units 11 of the plurality of imaging pixels 100 to the floating diffusion region 12 in parallel, and signal outputs from the imaging pixels 100 in the n-th row and the (n+1)th row are added.

Similarly, at time T4, TXs(n), TXs(n+1), TXs(n+2), and TXs(n+3) of the focus detection pixels 200 in the n-th row to the (n+3)th row transition from the low level to the high level. At time T5, TXs(n), TXs(n+1), TXs(n+2), and TXs (n+3) transition from the high level to the low level. This operation turns on the transfer transistors 13 in the n-th row to the (n+3)th row, and electrons generated during the exposure period 301 are transferred from the focus detection pixels 200 to the floating diffusion region 12. This causes the electrons to be transferred from the photoelectric conversion units 11 of the plurality of focus detection pixels 200 to the floating diffusion region 12 in parallel, and signal outputs from the focus detection pixels 200 in the n-th row to the (n+3)th row are added.

At time T6, TX(n+2) and TX(n+3) of the imaging pixels 100 in the (n+2)th row and the (n+3)th row transition from the low level to the high level. At time T7, TX(n+2) and TX(n+3) transition from the high level to the low level. This operation turns on the transfer transistors 13 in the (n+2)th row and the (n+3)th row, and electrons generated during the exposure period 301 are transferred from the imaging pixels 100 to the floating diffusion region 12. This adds signal outputs from the imaging pixels 100 in the (n+2)th row and the (n+3)th row.

Similarly, at time T8, TX(n+4) and TX(n+5) of the imaging pixels 100 in the (n+4)th row and the (n+5)th row transition from the low level to the high level. At time T9, TX(n+4) and TX(n+5) transition from the high level to the low level. This operation turns on the transfer transistors 13 in the (n+4)th row and the (n+5)th row, and electrons generated during the exposure period 301 are transferred from the imaging pixels 100 to the floating diffusion region 12. This adds signal outputs from the imaging pixels 100 in the (n+4)th row and the (n+5)th row.

Through the operation described above, even if there are an imaging pixel 100 and a focus detection pixel 200 in the same pixel row, transfer from the imaging pixel 100 and transfer from the focus detection pixel 200 can be individually controlled to read signals via the transfer control line TX and the transfer control line TXs, respectively. Therefore, the added number for the imaging pixel 100 and the added number for the focus detection pixel 200 can be different from each other. Specifically, in this embodiment, signals from two pixels are added for the imaging pixel 100 and signals from four pixels are added for the focus detection pixel 200. As a result, by configuring the added number for the focus detection pixel 200 to be larger than the added number for the imaging pixel 100, a high sensitivity output of the focus detection pixel 200 can be obtained. On the other hand, the added number for the imaging pixel 100 is set to be smaller than that for the focus detection pixel 200, and degradation in resolution due to the adding is reduced. By adopting the pixel circuit structure and timing for driving described above, a solid-state imaging apparatus can be arranged which attains both a higher resolution of an imaging pixel and higher sensitivity of a focus detection pixel, and improves resolution of an image as well as focus detection performance when the brightness is low.

Note that, in this embodiment, two imaging pixels 100 share one amplifier transistor 14, and four focus detection pixels 200 share one amplifier transistor 14. Specifically, the shared number for the imaging pixel 100 is two, and the shared number for the focus detection pixel 200 is four. However, as a modified example, the shared number for the imaging pixel 100 and the shared number for the focus detection pixel 200 may be the same. For example, four imaging pixels 100 may share one amplifier transistor 14. Also with such a structure, timing for driving is similarly set as described above, and hence transfer from the imaging pixel 100 and transfer from the focus detection pixel 200 can be individually controlled via the transfer control line TX and the transfer control line TXs, respectively. Therefore, even if the shared numbers for the two kinds of pixels are the same from the viewpoint of an element structure, it is possible to drive the imaging pixel 100 and the focus detection pixel 200 under a state in which the added numbers for the pixels are different from each other. Thus, a similar effect can be obtained. As the shared number for a pixel becomes larger, the number of transistors per pixel can be reduced more, and thus, an area of the photoelectric conversion unit 11 can become larger. As a result, the sensitivity can be improved.

Second Embodiment

A second embodiment of the present invention is described in the following. Note that, in the second to fourth embodiments, the shared numbers for the pixels are described on the assumption that the shared number for the imaging pixel 100 is one, that is, no adding of pixels is made, and the shared number for the focus detection pixel is two. As a modified example, the shared number for the imaging pixel and the shared number for the focus detection pixel may be the same.

Figure 4:
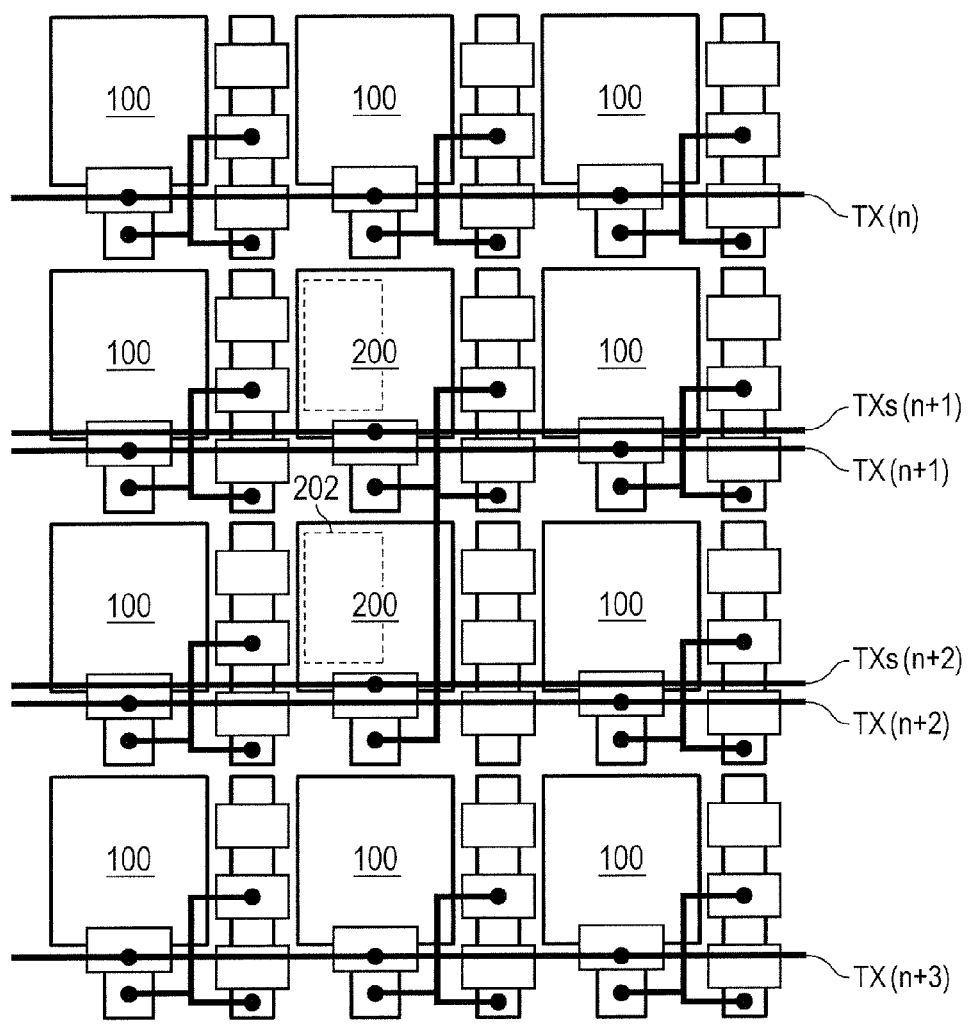
FIG. 4 is a plan view illustrating a layout of a pixel structure according to a second embodiment of the present invention.

FIG. 4 is a plan view illustrating a layout of a pixel structure according to the second embodiment of the present invention. In the second embodiment, the pixel circuit structure is similar to that in the first embodiment except that the shared number is different. Further, the second embodiment is different from the first embodiment in that the transfer control line TXs of the focus detection pixel 200 is arranged only in a row in which the focus detection pixel 200 exists, and the transfer control line TXs is not arranged in a row in which the focus detection pixel 200 does not exist. In other words, the number of the transfer control lines assigned to a pixel row that includes both the imaging pixel 100 and the focus detection pixel 200 is larger than the number of the transfer control lines assigned to a pixel row that includes the imaging pixel 100 but does not include the focus detection pixel 200. For example, one transfer control line TX(n) is assigned to the n-th pixel row, and two transfer control lines TX(n+1) and TXs(n+1) are assigned to the (n+1)th pixel row. It is not necessary to send a control signal for driving the focus detection pixel 200 in a row in which the focus detection pixel 200 does not exist, and thus, the pixel circuit can be driven in accordance with the timing chart illustrated in FIG. 3 without the transfer control line TXs.

According to this embodiment, the transfer control line TXs is not arranged in a row in which the focus detection pixel 200 does not exist, and thus, reduction in the amount of light by blocking of the incident light by an interconnect that forms the transfer control line TXs can be reduced to improve the sensitivity. This enables a signal to be obtained with a high S/N ratio.

Third Embodiment

A third embodiment of the present invention is described in the following with reference to FIG. 5. The third embodiment is different from the first embodiment in that a solid-state imaging apparatus according to the third embodiment does not include the transfer control line TXs of the focus detection pixel 200. Instead, the same transfer control line TX is connected to gate electrodes 17 of the transfer transistors 13 of a plurality of focus detection pixels 200 that share the floating diffusion region 12.

Figure 5:
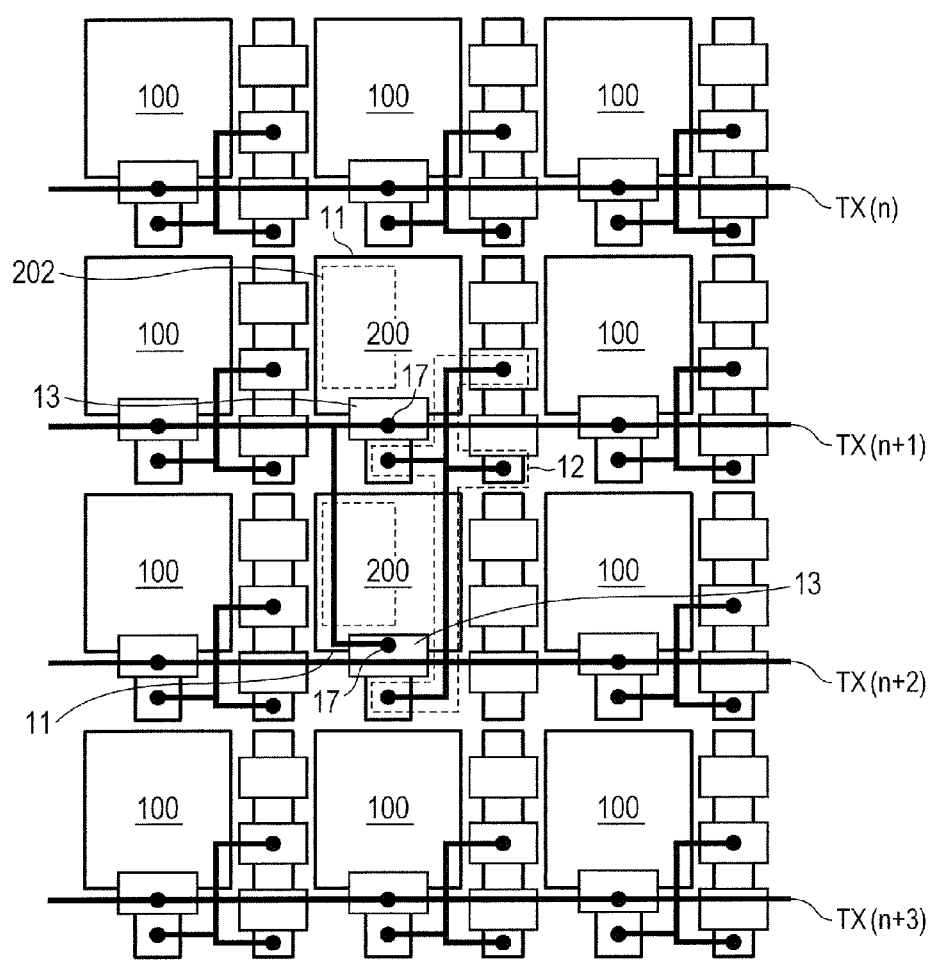
FIG. 5 is a plan view illustrating a layout of a pixel structure according to a third embodiment of the present invention.

FIG. 5 is a plan view illustrating a layout of a pixel structure according to the third embodiment of the present invention. The focus detection pixels 200 in the (n+1)th row and the (n+2)th row of the N-th column share the floating diffusion region. In addition to this, the gate electrodes 17 of the transfer transistors 13 in the focus detection pixels 200 in the (n+1)th row and the (n+2)th row in the N-th column are each connected to the transfer control line TX(n+1).

At time T4, the transfer control line TX(n+1) transitions from the low level to the high level, and, at time T5, transitions from the high level to the low level. Electric charges in the photoelectric conversion units 11 in the focus detection pixel 200 in the (n+1)th row and the focus detection pixel 200 in the (n+2)th row are simultaneously transferred to the floating diffusion region 12. With this, it is possible to add signals from the focus detection pixels 200 in the (n+1)th row and the (n+2)th row.

According to this embodiment, differently from the case of the first embodiment, the focus detection pixel 200 does not include the transfer control lines TXs, and thus, reduction in the amount of light by blocking of the incident light by interconnect that forms the transfer control line TXs can be reduced to improve the sensitivity. This enables a signal to be obtained with a high S/N ratio. Further, none of the pixel rows include the transfer control line TXs, and thus, a signal with a high S/N ratio can be obtained more effectively than in the case of the second embodiment.

Fourth Embodiment

Figure 6:
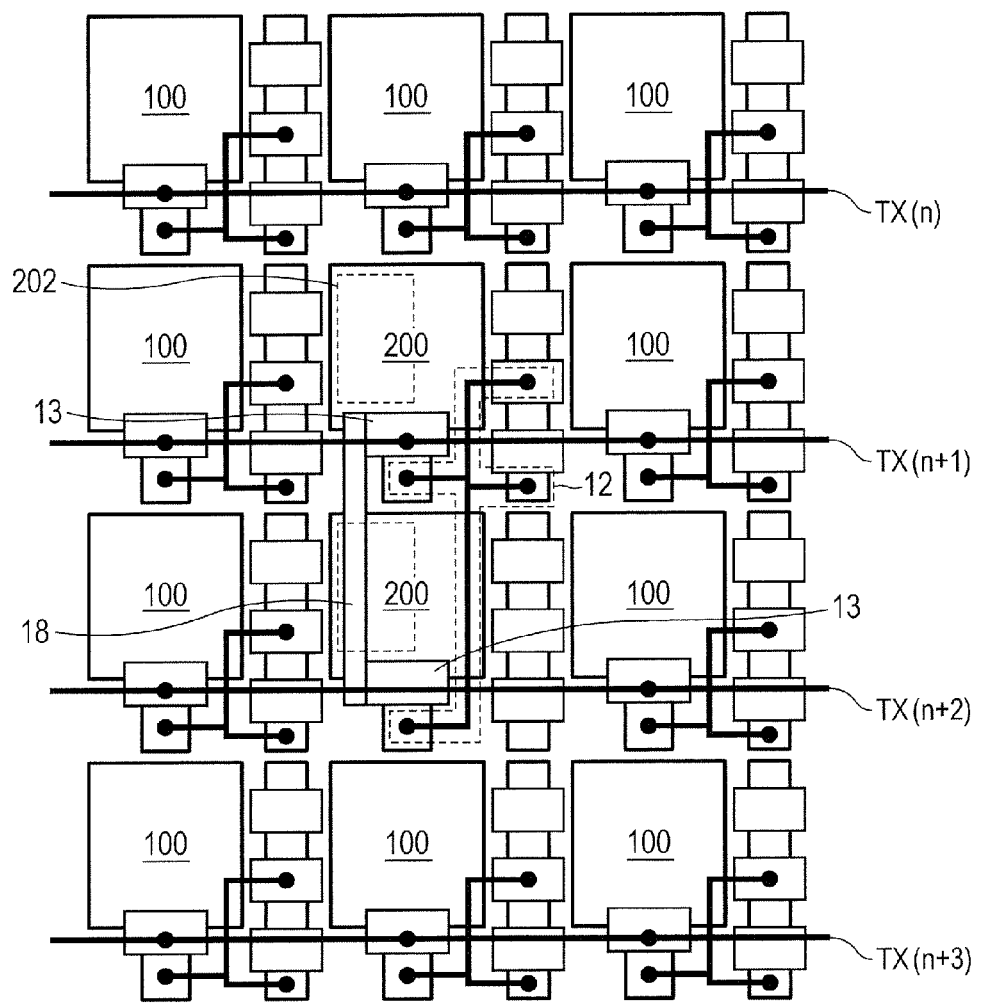
FIG. 6 is a plan view illustrating a layout of a pixel structure according to a fourth embodiment of the present invention.

A fourth embodiment of the present invention is described in the following with reference to FIG. 6. A pixel circuit according to the fourth embodiment has the same circuit structure as that in the third embodiment from the viewpoint of the circuit diagram, but the interconnects are differently arranged. Specifically, in the transfer transistors 13 of a plurality of focus detection pixels 200 that share the floating diffusion region 12, the interconnect that forms a connecting portion 18 between the gate electrodes of the transfer transistors 13 is formed of a conductive member and is also connected to the gate electrodes 17 of the focus detection pixels 200. From the viewpoint of simplifying the process, it is preferred that the gate electrodes 17 of the transfer transistors 13 and the connecting portion 18 between the gate electrodes of the transfer transistors 13 employing the interconnect formed of the same material in the same step.

According to this embodiment, connection can be made using the interconnect on the photoelectric conversion unit 11, and thus, incident light is difficult to block. Therefore, compared with the case in which connection is made by the transfer control line TX formed of the interconnect in the upper layer than the photoelectric conversion unit 11 as in the third embodiment, the amount of light that is incident on the photoelectric conversion unit 11 can be increased. Therefore, the sensitivity of a sensor is improved so that a signal with a high S/N ratio can be obtained.

Fifth Embodiment

Figure 7:
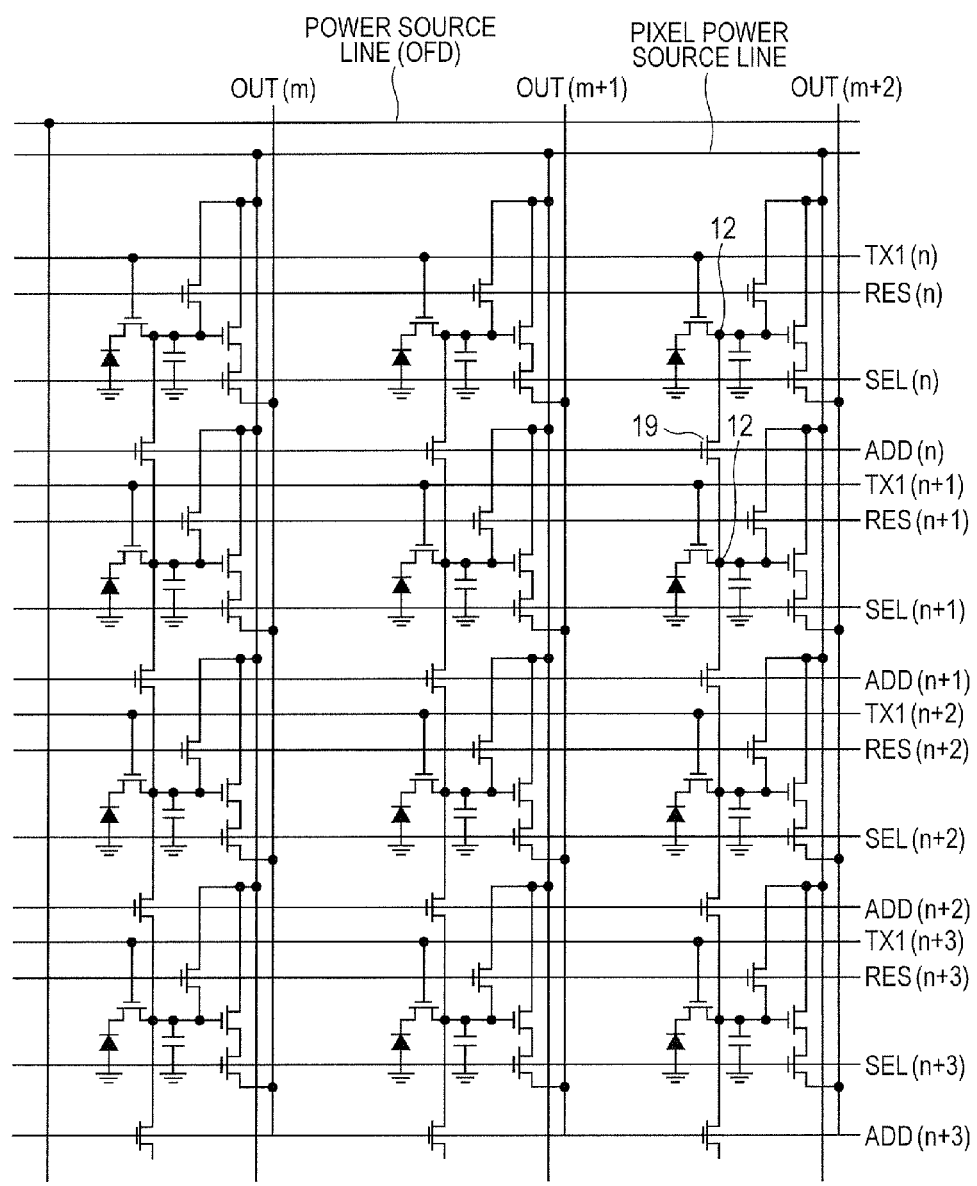
FIG. 7 illustrates a part of a pixel circuit structure according to a fifth embodiment of the present invention.

A fifth embodiment of the present invention is described in the following with reference to FIG. 7. The fifth embodiment is different from the first embodiment in that a adding transistor 19, or an adding transistor 19, is arranged on the interconnect that connects a plurality of floating diffusion regions to each other. When the adding transistor 19 is on, corresponding floating diffusion regions 12 are connected to each other, and, when the adding transistor 19 is off, corresponding floating diffusion regions 12 are disconnected from each other. With this structure, the added number can be changed by switching on or off the adding transistor, and hence an arbitrary added number can be selected in accordance with photographing conditions such as brightness of an object to be imaged.

According to this structure, even with photographing conditions in which the amount of incident light is small and an output of the pixel is small, by increasing the added number of the focus detection pixels in accordance with the photographing conditions, the output of the focus detection pixel can be increased. Thus, the sensitivity of the sensor is improved so that a signal with a high S/N ratio can be obtained.

Sixth Embodiment

Figure 8:
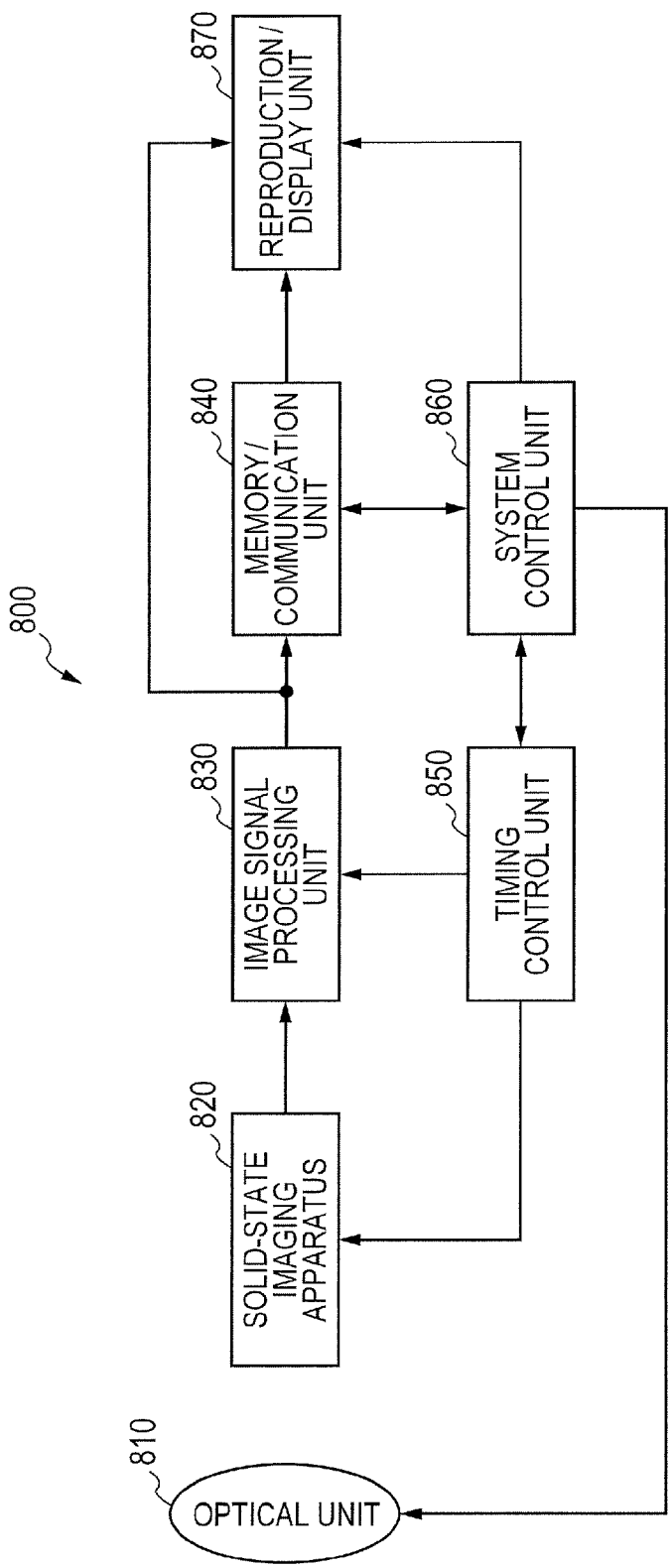
FIG. 8 illustrates a structure of an imaging system according to a sixth embodiment of the present invention.

FIG. 8 illustrates a structure of an imaging system according to a sixth embodiment of the present invention using the solid-state imaging apparatus according to any one of the first to fifth embodiments. An imaging system 800 includes an optical unit 810, a solid-state imaging apparatus 820, an image signal processing unit (a signal processor) 830, a memory/communication unit 840, a timing control unit 850, a system control unit 860, and a reproduction/display unit 870. As the solid-state imaging apparatus 820, the solid-state imaging apparatus including the imaging pixel 100 and the focus detection pixel 200 that is described above as the first, second, third, fourth, or fifth embodiment is used.

The optical unit 810 that is an optical system such as a lens images light from a subject on the pixel array 10 in which a plurality of the imaging pixels 100 and the focus detection pixels 200 are two-dimensionally arranged in the solid-state imaging apparatus 820 to form an image of the subject. The solid-state imaging apparatus 820 outputs a signal in accordance with light imaged on the imaging pixel 100 or the focus detection pixel 200 at a timing based on a signal from the timing control unit 850. The signal output from the solid-state imaging apparatus 820 is input to the image signal processing unit 830. The image signal processing unit 830 performs signal processing such as conversion of the input signal into image data in accordance with a method determined by a program or the like. Further, the image signal processing unit 830 obtains information on a distance to the subject that is necessary for adjusting the focus by processing the focusing signal that is output from the solid-state imaging apparatus. The signal obtained through the processing by the image signal processing unit 830 is sent to the memory/communication unit 840 as image data. The memory/communication unit 840 sends a signal for forming an image to the reproduction/display unit 870 to cause the reproduction/display unit 870 to reproduce or display moving images or a still image. In addition, the memory/communication unit 840 receives the signal from the image signal processing unit 830 to communicate with the system control unit 860 and record a signal for forming an image on a recording medium (not shown).

The system control unit 860 collectively controls operation of the imaging system 800, and controls the driving of the optical unit 810, the timing control unit 850, the memory/communication unit 840, and the reproduction/display unit 870. Further, the system control unit 860 includes a memory (not shown) that is, for example, a recording medium. A program or the like that is necessary for controlling operation of the imaging system 800 is recorded in the memory. Further, the system control unit 860 supplies into the imaging system 800 a signal for switching a driving mode in accordance with, for example, operation by a user. Specifically, a signal for changing a row to be read out or to be reset, changing an angle of view accompanying an electronic zoom, shifting an angle of view accompanying electronic image stabilization, or the like is supplied. The timing control unit 850 controls timing for driving the solid-state imaging apparatus 820 and the image signal processing unit 830 based on control by the system control unit 860.

The solid-state imaging apparatus 820 according to this embodiment attains both a higher resolution of the imaging pixel 100 and higher sensitivity of the focus detection pixel 200. Therefore, by mounting the solid-state imaging apparatus 820 according to this embodiment, the imaging system 800 that can form an image with a high resolution and can satisfactorily detect a focus even when the brightness is low can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-014120, filed on Jan. 29, 2014, which is hereby incorporated by reference wherein in its entirety.

What is claimed is:

1. A solid-state imaging apparatus, comprising:
   a plurality of imaging pixels each configured to generate, through photoelectric conversion, electric charge as an imaging signal;
   a plurality of first focus detection pixels each configured to generate, through photoelectric conversion, electric charge as at least a first focusing signal among first and second focusing signals used for a phase difference focus detection; and
   an adding unit configured to add the electric charge generated by the plurality of imaging pixels to generate an added imaging signal, and configured to add the electric charge generated by the plurality of first focus detection pixels to generate a first added focusing signal,
   wherein a number of the first focus detection pixels to be used for generating one first added focusing signal by the adding unit is larger than a number of the imaging pixels to be used for generating one added imaging signal by the adding unit, and wherein an operation for outputting the first added focusing signal and an operation for outputting each of the first focusing signals without adding are selectively carried out.

2. The solid-state imaging apparatus according to claim 1, wherein each of the plurality of imaging pixels and each of the plurality of focus detection pixels includes:
 a photoelectric conversion unit configured to generate the electric charge through the photoelectric conversion, and
 a transfer transistor configured to transfer the electric charge from the photoelectric conversion unit to a floating diffusion region configured to convert the electric charge into a voltage signal.

3. The solid-state imaging apparatus according to claim 1, wherein each of the imaging pixels and each of the first focus detection pixels include:
 a photoelectric conversion unit configured to generate the electric charge through the photoelectric conversion, and
 a transfer transistor configured to transfer the electric charge from the photoelectric conversion unit to a floating diffusion region configured to convert the electric charge into a voltage signal,
wherein the added imaging signal is generated by transferring the electric charge from the photoelectric conversion units of the plurality of imaging pixels to the floating diffusion region in parallel, and
wherein the first added focusing signal is generated by transferring the electric charge from the photoelectric conversion units of the plurality of first focus detection pixels to the floating diffusion region in parallel.

4. The solid-state imaging apparatus according to claim 2, wherein the plurality of imaging pixels and the plurality of first focus detection pixels form a pixel array in which the plurality of imaging pixels and the plurality of first focus detection pixels are arranged in a matrix,
wherein the pixel array includes a first pixel row that includes the imaging pixel and the first focus detection pixel, and a second pixel row that includes the imaging pixel and excludes the first focus detection pixel,
wherein the solid-state imaging apparatus further comprises a plurality of transfer control lines each configured to transmit a control signal for controlling the transfer transistor,
wherein the first pixel row includes a first transfer control line connected to the imaging pixel and a second transfer control line connected to the first focus detection pixel that are assigned thereto, and
wherein a number of the transfer control lines assigned to the first pixel row is larger than a number of the transfer control lines assigned to the second pixel row.

5. The solid-state imaging apparatus according to claim 2, wherein the plurality of imaging pixels and the plurality of first focus detection pixels form a pixel array in which the plurality of imaging pixels and the plurality of first focus detection pixels are arranged in a matrix,
wherein the pixel array includes a first pixel row that includes the imaging pixel and the first focus detection pixel, and a second pixel row that includes the imaging pixel and excludes the first focus detection pixel,
wherein the solid-state imaging apparatus further comprises a plurality of transfer control lines each configured to transmit a control signal for controlling the transfer transistor,
wherein the first pixel row includes a first transfer control line connected to the imaging pixel and a second transfer control line connected to the first focus detection pixel that are assigned thereto, and
wherein a number of the transfer control lines assigned to the first pixel row is the same as a number of the transfer control lines assigned to the second pixel row.

6. The solid-state imaging apparatus according to claim 2, wherein the plurality of imaging pixels and the plurality of first focus detection pixels form a pixel array in which the plurality of imaging pixels and the plurality of first focus detection pixels are arranged in a matrix,
wherein the solid-state imaging apparatus further comprises a transfer control line arranged for each of the rows, the transfer control line being configured to transmit a control signal for controlling the transfer transistor, and
wherein the transfer control line is connected to a gate electrode of a transfer transistor of a first focus detection pixel included in a first pixel row and to a gate electrode of a transfer transistor of a first focus detection pixel included in a second pixel row that is different from the first pixel row.

7. The solid-state imaging apparatus according to claim 2, wherein the plurality of imaging pixels and the plurality of first focus detection pixels form a pixel array in which the plurality of imaging pixels and the plurality of first focus detection pixels are arranged in a matrix, and
wherein the solid-state imaging apparatus further comprises an interconnect configured to connect to each other a gate electrode of a transfer transistor of a first focus detection pixel included in a first pixel row and a gate electrode of a transfer transistor of a first focus detection pixel included in a second pixel row that is different from the first pixel row, the interconnect being formed of the same material as a material forming the gate electrodes.

8. The solid-state imaging apparatus according to claim 1, wherein each of the imaging pixels and each of the first focus detection pixels include:
 a photoelectric conversion unit configured to generate the electric charge through the photoelectric conversion,
 a floating diffusion region configured to convert the electric charge into a voltage signal, and
 a transfer transistor configured to transfer the electric charge from the photoelectric conversion unit to the floating diffusion region, and
wherein, in a plurality of pixels for which signals are added by the adding unit, the floating diffusion regions are connected to each other via a conductive member.

9. The solid-state imaging apparatus according to claim 1, wherein a voltage signal from the imaging pixel and a voltage signal from the first focus detection pixel are read out based on control signals that are different from each other.

10. The solid-state imaging apparatus according to claim 1,
wherein each of the imaging pixels and each of the first focus detection pixels include an amplifier transistor configured to amplify one of the imaging signal and the first focusing signal to output an amplified signal, and wherein the adding unit generates the first added focusing signal in a preceding stage to the amplifier transistor.

11. The solid-state imaging apparatus according to claim 1,
wherein a part of a photoelectric conversion unit included in each of the first focus detection pixels is covered with a light shielding portion, and
wherein a photoelectric conversion unit included in each of the plurality of imaging pixels is one of prevented from being covered with the light shielding portion and covered with the light shielding portion in an area that is smaller than an area of the part of the photoelectric conversion unit included in each of the plurality of first focus detection pixels.

12. An imaging system, comprising:
the solid-state imaging apparatus according to claim 1; and
a signal processor configured to process a focusing signal that is output from the solid-state imaging apparatus to obtain information on a distance to a subject.

13. The solid-state imaging apparatus according to claim 1, further comprising a plurality of second focus detection pixels each configured to generate, through photoelectric conversion, electric charge as at least the second focusing signal, wherein the adding unit is further configured to add the electric charge generated by the plurality of second focus detection pixels to generate a second added focusing signal,
wherein the first focus detection pixels and the second focus detection pixels are different from each other in a portion covered with a light shielding portion.

14. A solid-state imaging apparatus, comprising:
a plurality of imaging pixels each configured to generate, through photoelectric conversion, electric charge as an imaging signal;
a plurality of focus detection pixels each configured to generate, through photoelectric conversion, electric charge as at least a first focusing signal among first and second focusing signals used for a phase difference focus detection; and
an adding unit configured to avoid adding the electric charge generated by the plurality of imaging pixels, and configured to add the electric charge generated by the plurality of focus detection pixels to generate an added focusing signal,
wherein an operation for outputting the added focusing signal and an operation for outputting each of the first focusing signals without adding are selectively carried out.

15. The solid-state imaging apparatus according to claim 14, further comprising a plurality of second focus detection pixels each configured to generate, through photoelectric conversion, electric charge as at least the second focusing signal, wherein the adding unit is further configured to add the electric charge generated by the plurality of second focus detection pixels to generate a second added focusing signal,
wherein the first focus detection pixels and the second focus detection pixels are different from each other in a portion covered with a light shielding portion.

16. A solid-state imaging apparatus, comprising:
a plurality of imaging pixels each configured to generate, through photoelectric conversion, electric charge as an imaging signal;
a plurality of focus detection pixels each configured to generate, through photoelectric conversion, electric charge as at least a first focusing signal among first and second focusing signals used for a phase difference focus detection; and
an adding unit configured to add the electric charge generated by the plurality of imaging pixels to generate an added imaging signal, and configured to add the electric charge generated by the plurality of focus detection pixels to generate an added focusing signal,
wherein a number of the focus detection pixels to be used for generating one added focusing signal by the adding unit is larger than a number of the imaging pixels to be used for generating one added imaging signal by the adding unit,
wherein each of the imaging pixels and each of the focus detection pixels include:
a photoelectric conversion unit configured to generate the electric charge through the photoelectric conversion,
a floating diffusion region configured to convert the electric charge into a voltage signal, and
a transfer transistor configured to transfer the electric charge from the photoelectric conversion unit to the floating diffusion region, and
wherein the adding unit includes an adding transistor configured to allow the floating diffusion regions to be switched between one of a mutually connected state and a mutually disconnected state.

17. The solid-state imaging apparatus according to claim 16, further comprising a plurality of second focus detection pixels each configured to generate, through photoelectric conversion, electric charge as at least the second focusing signal, wherein the adding unit is further configured to add the electric charge generated by the plurality of second focus detection pixels to generate a second added focusing signal,
wherein the first focus detection pixels and the second focus detection pixels are different from each other in a portion covered with a light shielding portion.

18. A solid-state imaging apparatus, comprising:
a plurality of imaging pixels each configured to generate, through photoelectric conversion, electric charge as an imaging signal;
a plurality of focus detection pixels each configured to generate, through photoelectric conversion, electric charge as at least a first focusing signal among first and second focusing signals used for a phase difference focus detection; and
an adding unit configured to avoid adding the electric charge generated by the plurality of imaging pixels, and configured to add the electric charge generated by the plurality of focus detection pixels to generate an added focusing signal,
wherein each of the imaging pixels and each of the focus detection pixels include:
a photoelectric conversion unit configured to generate the electric charge through the photoelectric conversion,
a floating diffusion region configured to convert the electric charge into a voltage signal, and
a transfer transistor configured to transfer the electric charge from the photoelectric conversion unit to the floating diffusion region, and
wherein the adding unit includes an adding transistor configured to allow the floating diffusion regions to be switched between one of a mutually connected state and a mutually disconnected state.

19. The solid-state imaging apparatus according to claim 18, further comprising a plurality of second focus detection pixels each configured to generate, through photoelectric conversion, electric charge as at least the second focusing signal, wherein the adding unit is further configured to add the electric charge generated by the plurality of second focus detection pixels to generate a second added focusing signal, wherein the first focus detection pixels and the second focus detection pixels are different from each other in a portion covered with a light shielding portion.

* * * * *